United States Patent [19]

Felix

[11] Patent Number: 5,011,559

[45] Date of Patent: Apr. 30, 1991

[54] PROCESS FOR THE MANUFACTURE OF SHEETS OR PAGES WITH SEPARABLE SELF-ADHESIVE LABELS

[75] Inventor: Willi Felix, Strengelbach, Switzerland

[73] Assignee: Jos. Hunkeler Ltd., Wikon, Switzerland

[21] Appl. No.: 210,398

[22] Filed: Jun. 23, 1988

Related U.S. Application Data

[63] Continuation of Ser. No. 810,287, Jan. 27, 1986.

[30] Foreign Application Priority Data

Mar. 29, 1984 [CH] Switzerland ........................ 1605/84

[51] Int. Cl.[5] ........................ B32B 31/12; B32B 31/10; B32B 31/06; B31F 1/00

[52] U.S. Cl. .................................... 156/257; 156/247; 156/252; 156/268; 156/291; 428/41; 428/43; 40/299; 40/360; 283/81

[58] Field of Search ................. 40/2 R, 360, 594, 595; 156/247, 249, 252, 344, 257, 268, 291; 206/390, 411, 460, 820; 283/81; 428/40, 41, 42, 43; 493/333, 345, 396, 944, 961

[56] References Cited

U.S. PATENT DOCUMENTS 4,214,024 7/1980 Jacobson ............................. 40/2 R

FOREIGN PATENT DOCUMENTS 2127378 4/1984 United Kingdom .

*Primary Examiner*—William E. Terrell

*Attorney, Agent, or Firm*—Davis Hoxie Faithfull & Hapgood

[57] ABSTRACT

Sheets or pages containing integral but separable self-adhesive labels are manufactured by forming an integral label in the sheet or page by application of perforations, or attenuating lines, applying adhesive to the back of the sheet or page in the area of the label, and covering the applied adhesive with a separating sheet of paper or plastic. The label can be formed in the sheet or page either before or after the adhesive and covering are applied.

14 Claims, 2 Drawing Sheets

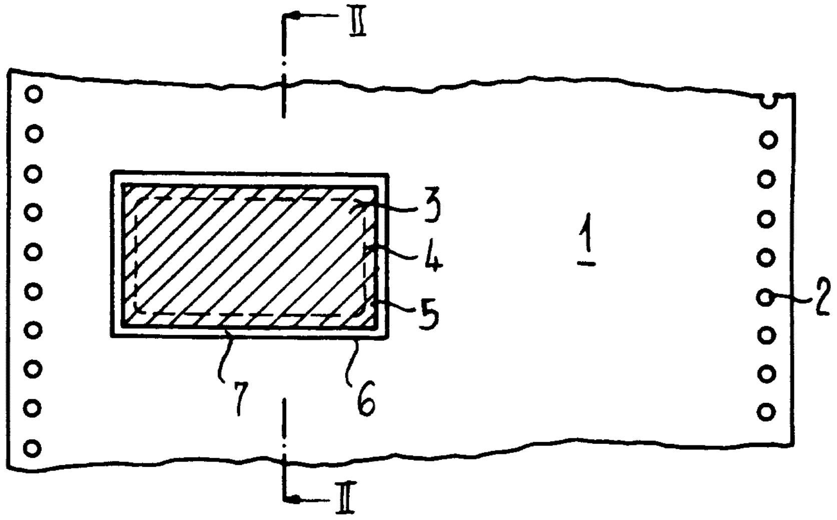
Fig. 1
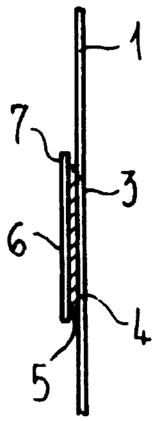
Fig. 2
Fig. 3
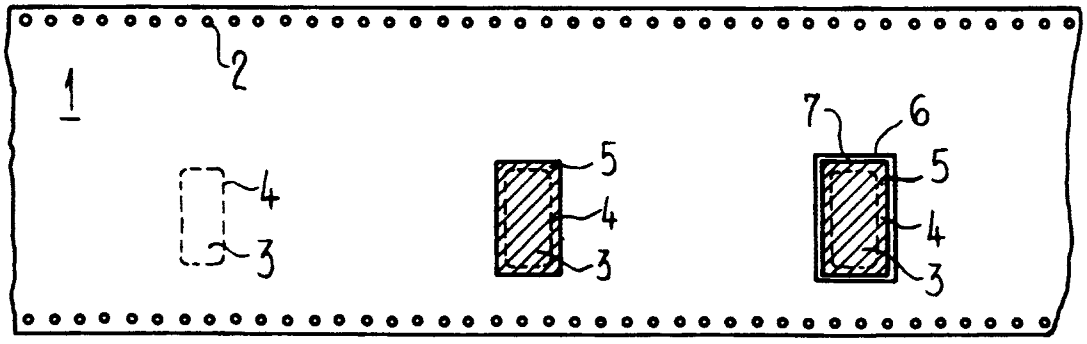

PROCESS FOR THE MANUFACTURE OF SHEETS OR PAGES WITH SEPARABLE SELF-ADHESIVE LABELS

This is a continuation of co-pending application Ser. No. 810,287 filed on Jan. 27, 1986.

The invention relates to the manufacture of sheets or pages containing integral separable self-adhesive labels.

Sheets, for example printed forms, with separable self-adhesive labels are known. They are obtained by the attachment of multi-layer strips, generally in the form of rolls, of separated labels. These multi-layer strips have an initial layer of adhesive on the label, that is separated by an initial silicon paper from the following second adhesive layer, followed by a second silicon paper. When applying the individual labels, separated from the continuous roll, to a form, the second silicon paper is removed and the label attached to the form with the second adhesive layer. The label adhering to the form now consists of four layers: label, adhesive layer, silicon paper and adhesive layer, and causes a localized thickening of the individual form, which leads to difficulties when stacking the forms or handling the stack. When writing on the self-adhesive label, the influence of heat and/or pressure, as is present, for example, during laser printing, leads to the softening of the two adhesive layers and the appearance beyond the label and on the form of the adhesive coating reaching the edges at least at the cut edges. These forms, which are now sticky at points, adhere to one another, are unattractive and difficult to handle. Aside from the difficulties mentioned above when handling the forms provided with these known self-adhesive labels, the manufacture of the five-layered continuous label roles is costly and complicated. In particular, the provision of the silicon paper, which does have separating characteristics, with an adhesive layer, is complicated and costly.

In order to avoid the above-mentioned localized thickening of the form caused by the multi-layered self-adhesive label and the handling difficulties connected therewith, forms were produced with integrated self-adhesive labels separable along a perforation. Since the label here is already contained in the form, i.e., it forms a portion of the form, it no longer leads to a localized thickening; at the same time, one less adhesive layer and one less silicon paper is required. The label in this known form is covered over its entire surface with an adhesive via a separating paper bearing an adhesive, i.e., a transfer adhesive, that is drawn from a roll and cut to the size of the label. Here again, however, the appearance of the adhesive under the influence of heat and/or pressure during printing of the label is observed at least at the edges corresponding to the cut, which leads to the undesirable stickiness of the rest of the form and the corresponding disadvantages mentioned above. Moreover, when positioning the transfer adhesive, very precise operations are required to secure a precise adhesive coat. Furthermore, the adhesive in the rolled-up transfer adhesives can be picked up by the adhesive-free surfaces, due to the separating characteristics, and its undesirable stickiness leads to the adherence to one another of the forms lying above each other.

The task of the present invention is therefore to provide a simple and economical process for the manufacture of sheets or pages with separable self-adhesive labels that facilitates proper adhesive coating that does not appear on the surrounding area in an undesirable manner beyond the predetermined adhesive area, under the influence of heat and/or pressure, particularly during printing of the label.

SUMMARY OF THE INVENTION

The objectives of this invention are achieved by the process described below, which permits manufacture of label-containing sheets not having the drawbacks of the known label-containing sheets described above.

The adhesive, which is paste or liquid at the time of application, is well-anchored in the paper by the application of the adhesive directly onto the paper in the area of the label. Possibly one may at the same time apply adhesive onto other predetermined areas of the sheet.

The direct coating also of adhesive permits a differentiated, localized dosing of the adhesive, which leads, on the one hand, to savings in adhesive and on the other, to the manufacture of self-adhesive labels with custom-tailored adhesive power over its surface.

For example, a decreasing amount of adhesive can be applied to the edges of the label, or the edges of the label can be kept adhesive-free. Furthermore, the adhesive can be applied according to a predetermined pattern, e.g., in the form of points. This point pattern can be shaped, for example, in such manner that a continuous adhesive layer forms under the influence of heat and/or pressure. Individual or all corners of the label can be left completely free of adhesive to facilitate the removal of the separating paper.

The adhesive coating is not limited only to labels, but can be used, if desired, on the closing areas of a form. Naturally, the adhesive coating can correspond precisely to the label surface limited by attenuating or separating lines.

The paper or plastic with separating characteristics, in contrast to the state of the art described above, does not have the function of transferring the adhesive, but only of protection. Correspondingly, its quality, size and form can be adjusted to only this protective function. Thus, it can jut on one or all sides over the surface provided with adhesive on the label and, possibly, the the label or the sheet.

The process pursuant to the invention is particularly suitable for the manufacture of forms, printed sheets or pages, preferably continuous forms, with separable self-adhesive labels.

The process pursuant to the invention can be performed with known equipment and using known adhesives based on water or solvents or fusion adhesives.

DETAILED DESCRIPTION OF THE INVENTION

Figure 4:
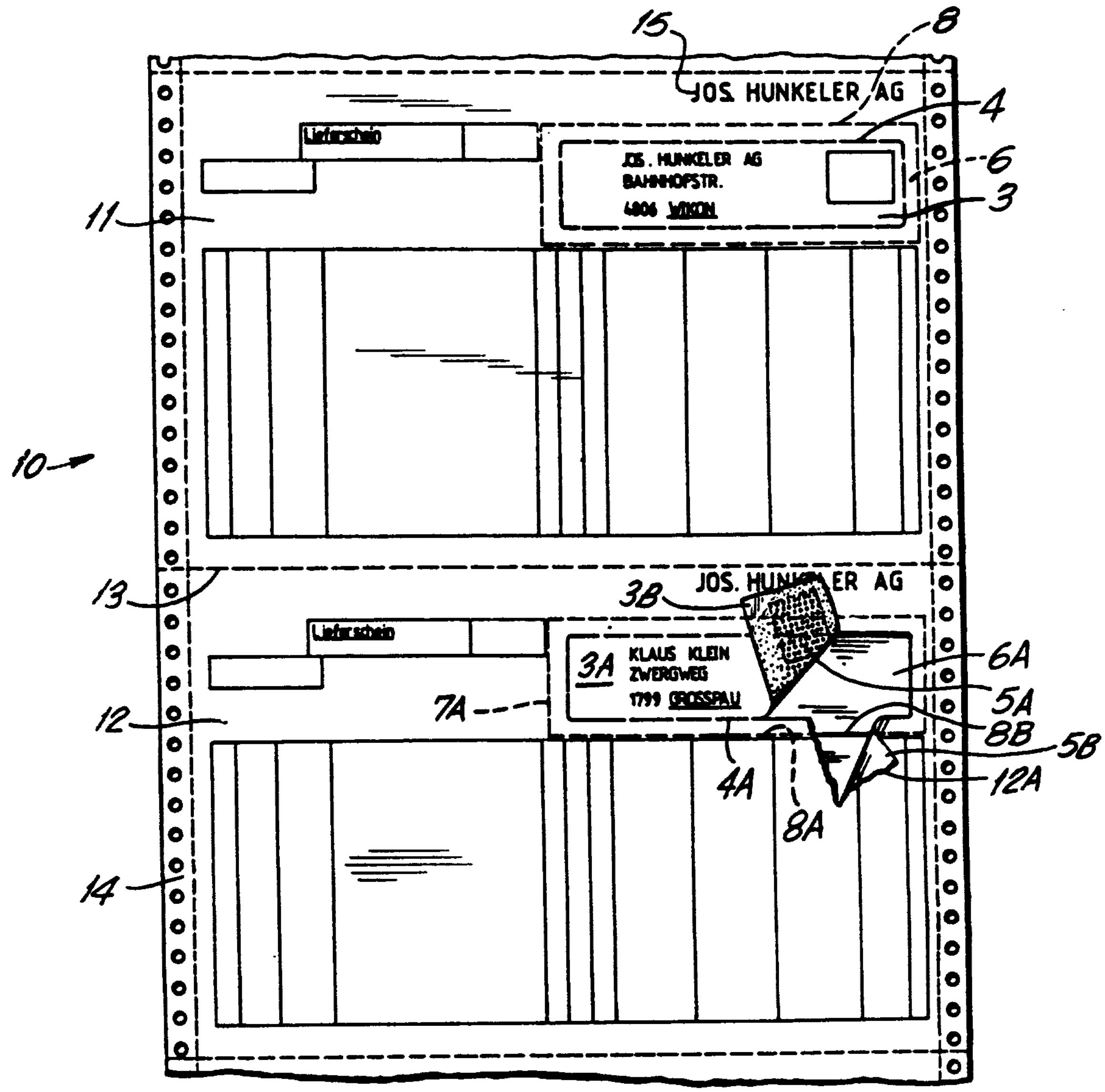

The invention is now explained in detail based on FIGS. 1 through 3. They show, in pure schematic form:

FIG. 1: the topview of the reverse i.e., a bottom view, of a section of a continuous form produced pursuant to the invention, showing a separable self-adhesive label;

FIG. 2: a cross-section along Line II—II in FIG. 1; and

FIG. 3: the topview of the reverse, i.e., a bottom view, of a continuous form during the individual steps of one embodiment of the process pursuant to the invention.

FIG. 4: a topview of continuous printed forms having separable self-adhesive labels according to this invention.

Referring to FIG. 1, continuous form 1 contains perforated margins 2, often referred to as edge perforations, and stamped label 3 that is fully integrated into the sheet of continuous form 1, but, as a result of the stamped attenuating lines 4 delimiting it, which may be produced, for example, by perforation, it can be separated easily from the sheet. Label 3 and the surrounding area of continuous form 1 beyond attenuating line 4 are provided with a continuous adhesive coat 5. The latter is protected by a siliconized separating paper 6, whose edges 7 jut over adhesive coat 5 in such manner that separating paper 6 can be easily grasped and removed from all sides. The use of overextending permits a larger tolerance in the positioning of the separating paper.

Pursuant to the embodiment of the process of to the invention shown in FIG. 3, label 3 is stamped in continuous form 1, which preferably is printed and previously provided on both sides with perforated margins 2, through application of perforations 4; thereafter the adhesive is applied in liquid or paste form on label 3 and on the area immediately surrounding label 3 of the continuous form. Thereafter adhesive coating 5 is covered with separating paper 6, whose edges 7 jut beyond adhesive layer 5.

The individual steps of the process pursuant to the invention, i.e., stamping, adhesive coating, application of separating paper, can be undertaken with known equipment, which can be arranged in existing production plants. Moreover, as workers in the art will recognize, with proper arrangement of equipment these individual steps can all be accomplished in the same production position.

The individual manufacturing steps mentioned above may also be undertaken in a sequence other than that explained based on FIG. 3. Thus, it is also particularly possible to apply the adhesive to material strip 1 first in the areas of label 3 in the manner described and then cover this adhesive coating 5 with separating paper 6. Finally, i.e., as the last step, label 3 is stamped, i.e., perforation 4 is applied.

Separating paper 6 can also be carbon paper with direct transfer onto label 3 during application of information, e.g., an address. In such a method of embodiment, separating paper 6 thus becomes a data carrier.

FIG. 4 shows a segment of a strip of printed business forms including separable self-adhesive labels according to one embodiment of this invention. Strip segment 10 includes two printed forms 11, 12, which can be separated at cross perforation attenuation line 13. The strip contains at each side perforated margins 14. Referring to form 11, the form includes printed text such as is shown at 15. As stated above, form 11 preferably is preprinted, that is, printed prior to formation of the separable label. Form 11 contains a separable self-adhesive label formed as described above, particularly in connection with FIG. 3. Label 3 is separable from the remainder of form 11 along stamped attenuation lines, or perforations, 4. On the underside of form 11 is separating paper 6, here shown by dashed lines 8. Referring to form 12 of FIG. 4 there is depicted a label 3A shown in tear-away perspective as if partially removed from the form. For illustration an adjacent portion 12A of the form 12 is also shown in tear-away perspective. As depicted a portion of label 3A has been separated from the remainder of form 12 by tearing along perforations 4A, exposing a portion of separating paper 6A and also exposing, on the underside of label 3A, adhesive coat portion 5A. Adhesive coat 5A in this embodiment is in the form of a pattern comprising a multiplicity of adhesive points such that, as has been described above, there is a decreasing amount of adhesive near the edges of label 3A and no adhesive at corner 3B. Torn-away section 12A of form 12 reveals portion 8B of side 8A of separating paper 6A, whose outline 7A otherwise being shown in dashed lines. Section 12A shows adhesive coat portion 5B. Thus, the adhesive coat 5A, 5B, has extended beyond label 3A, i.e., across perforations 4A, but has not extended as far as the sides 8A, 8B of separating paper 6A.

Pursuant to the invention, individual forms or unprinted individual or continuous sheets or pages can be provided with one or more integrated and separable self-adhesive labels. The process pursuant to the invention is economical and delivers a custom-made product that creates no problems in handling.

I claim:

1. A process for manufacturing a first sheet containing at least on integral but separable self-adhesive label comprising the steps of:

a. creating at least one integral but separable label in said sheet by applying attenuating lines to said sheet, b. applying an adhesive coating selectively to at least a portion of the area of said at least one label, and c. applying to said adhesive coating a second, protective sheet to which the adhesive coating adheres significantly less to said at least one label, such that said protective sheet having edges, such that said protective sheet entirely covers said adhesive coating and that such that the edges of said protective sheet project beyond said adhesive coating, wherein steps b. and c. are performed consecutively without interposition of step a.

2. The process according to claim 1 wherein said first sheet is paper.

3. The process according to claim 2 wherein step a. precedes steps b. and c.

4. The process according to claim 2 wherein step b. comprises applying said adhesive coating so as to leave at least one corner of said at least one label free of adhesive.

5. The process according to claim 2 wherein step b. comprises applying said adhesive coating to the area of said at least one label and to the area of said paper sheet immediately surrounding the at least one label.

6. The process according to claim 2 wherein step b. comprises applying said adhesive coating as a non-uniform predetermined pattern.

7. The process according to claim 6 comprising applying said adhesive coating as a point pattern.

8. The process according to claim 6 comprising applying said adhesive coating more thickly near the center of said at least one label than near the edges of said at least one label.

9. The process according to claim 2 wherein all of steps a., b., and c. are performed in the same position on a production line.

10. A process for manufacturing from a continuous paper web continuous forms with integral but separable self-adhesive labels comprising the steps of:

a. applying attenuating lines to the web at preselected locations to create integral but separable labels.

b. applying an adhesive coating to the web at said preselected locations to provide at each location an adhesive layer whose edges jut beyond the attenuating lines defining said labels, and c. applying to each of said adhesive layers a protective sheet having separating properties such that the edges of the protective sheets jut beyond the edges of the adhesive layers.

wherein steps b. and c. are performed consecutively without interposition of step a.

11. The process according to claim 10 wherein step a. precedes steps b. and c.

12. The process according to claim 10 wherein step b.

comprises applying said adhesive coating in a non-uniform predetermined pattern.

13. The process according to claim 10 wherein the continuous paper web is pre-printed.

14. The process according to claim 10 wherein steps a., b. and c. are performed in the same position on a production line.

* * * * *

UNITED STATES PATENT AND TRADEMARK OFFICE
CERTIFICATE OF CORRECTION

PATENT NO. : 5,011,559

DATED : April 30, 1991

INVENTOR(S) : Willi Felix

It is certified that error appears in the above-identified patent and that said Letters Patent is hereby corrected as shown below:

On the title page, Foreign Application Priority Data includes:

Mar. 28, 1985 PCT PCT/CH85/00049

Signed and Sealed this

Sixth Day of April, 1993

*Attest:*

STEPHEN G. KUNIN

*Attesting Officer*

*Acting Commissioner of Patents and Trademarks*